US009130388B2

United States Patent
Matsui et al.

(10) Patent No.: US 9,130,388 B2
(45) Date of Patent: Sep. 8, 2015

(54) CONTACTLESS ELECTRICITY-SUPPLYING DEVICE

(75) Inventors: Ryoji Matsui, Osaka (JP); Toshiyuki Fujita, Osaka (JP); Hironori Kambara, Osaka (JP); Masayoshi Ozaki, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 479 days.

(21) Appl. No.: 13/574,312

(22) PCT Filed: Nov. 12, 2010

(86) PCT No.: PCT/JP2010/070225
§ 371 (c)(1),
(2), (4) Date: Jul. 20, 2012

(87) PCT Pub. No.: WO2011/089776
PCT Pub. Date: Jul. 28, 2011

(65) Prior Publication Data
US 2012/0314465 A1  Dec. 13, 2012

(30) Foreign Application Priority Data
Jan. 21, 2010  (JP) ................................ 2010-011041

(51) Int. Cl.
*H02M 3/335* (2006.01)
*H02J 5/00* (2006.01)
*H02M 3/158* (2006.01)

(52) U.S. Cl.
CPC ........... *H02J 5/005* (2013.01); *H02M 3/33592* (2013.01); *H02M 3/1584* (2013.01); *H02M 3/33576* (2013.01)

(58) Field of Classification Search
USPC ................... 363/67, 69, 70, 84, 89; 307/104; 320/108
See application file for complete search history.

(56) References Cited

U.S. PATENT DOCUMENTS

| 5,440,302 A | 8/1995 | Irmer et al. |
| 5,831,348 A * | 11/1998 | Nishizawa .................... 307/104 |
| 7,212,414 B2 * | 5/2007 | Baarman ......................... 363/16 |
| 8,243,473 B2 * | 8/2012 | Chen et al. ...................... 363/16 |

(Continued)

FOREIGN PATENT DOCUMENTS

| JP | 8-149723 | 6/1996 |
| JP | 2005-210801 | 8/2005 |

(Continued)

OTHER PUBLICATIONS

International Search Report for PCT/JP2010/070225 mailed Feb. 15, 2011.

*Primary Examiner* — Jue Zhang
*Assistant Examiner* — Lakaisha Jackson
(74) *Attorney, Agent, or Firm* — Nixon & Vanderhye, P.C.

(57) ABSTRACT

There is provided a contactless electricity-supplying device that can safely and efficiently supply power to a load.
A contactless electricity-supplying device includes a plurality of electricity-supplying coils; a DC/AC converter that converts an output voltage from a DC supplying unit into an AC voltage to be applied to each electricity-supplying coils; a plurality of electricity-receiving coils selectively and detachably mounted on positions where the electricity-receiving coils are electromagnetically coupled to the electricity-supplying coils to receive AC voltages from the corresponding electricity-supplying coils in a contactless manner; a plurality of rectifying/smooth units that each convert an AC voltage output from each electricity-receiving coil into a DC voltage and smooth the DC voltage; a switching device that connects the DC voltages output from the rectifying/smoothing units to a single load; an electricity-reception detection sensor for detecting that the electricity-receiving coils receive the AC voltages from the corresponding electricity-supplying coils; and a control unit that turns on the switching device when it is detected that all of the electricity-receiving coils receive the AC voltages from the corresponding electricity-supplying coils.

11 Claims, 3 Drawing Sheets

(56) References Cited

U.S. PATENT DOCUMENTS

2008/0298100 A1* 12/2008 Esaka et al. .................. 363/67
2010/0314947 A1* 12/2010 Baarman et al. ............. 307/104

FOREIGN PATENT DOCUMENTS

| | | |
|---|---|---|
| JP | 2006-333557 | 12/2006 |
| WO | WO 2009/045847 | 4/2009 |

* cited by examiner

CONTACTLESS ELECTRICITY-SUPPLYING DEVICE

This application is the U.S. national phase of International Application No. PCT/JP2010/070225 filed 12 Nov. 2010 which designated the U.S. and claims priority to JP 2010-011041 filed 21 Jan. 2010, the entire contents of each of which are hereby incorporated by reference.

TECHNICAL FIELD

The present invention relates to a contactless electricity-supplying device.

BACKGROUND ART

Recently, a dispersed power source device such as a solar cell has been widely used. However, under present circumstances, a DC power generated in the dispersed power source device is converted into an AC power, and then, the AC power is again converted into a DC power in a device that consumes power, and is used. Every time the DC-AC conversion and AC-DC conversion are executed as described above, a conversion loss is caused. In view of this, there has been proposed that the DC power generated in the dispersed power source device is not converted into AC but transmitted as unchanged, and is used in the device, in order to reduce the conversion loss.

A contactless electricity-supplying technique has also been studied as a household outlet in a DC transmission. This technique provides an outlet that can be safely attached and detached even when current is applied, wherein an electricity-supplying side and an electricity-receiving side of an insulating transformer are separable, the electricity-supplying side of the insulating transformer is configured as a socket of an outlet, and the electricity-receiving side of the insulating transformer is configured as a plug of the outlet.

Home electrical appliances include a large-capacity device with a large power consumption, such as an air conditioner, and a dryer. In a contactless electricity-supplying technique, electric power that can be supplied is determined by a power capacity of the insulating transformer. For example, when a large power (500 W or more) can be supplied with one contactless electricity-supplying device, the insulating transformer increases. When this insulating transformer is used, it is inevitable that the efficiency upon supplying a low power (e.g., 100 W or less) is reduced. Even if a contactless electricity-supplying device that can supply only a small power is manufactured, a high-power device cannot be connected.

As a technique for solving this problem, there has been known a contactless electricity-supplying device including plural driving circuits and electricity-supplying coils at the electricity-supplying side, wherein the number of the electricity-supplying coils which drives according to a supplied current amount at the electricity-supplying side is changed in order to prevent a voltage variation caused by an increase and decrease in a load at an electricity-receiving side (e.g., see Patent Document 1).

PRIOR ART DOCUMENT

Patent Document

Patent Document 1: Japanese Patent Laid-open Publication No. 2005-210801

SUMMARY OF THE INVENTION

Problems to be Solved by the Invention

In the conventional contactless electricity-supplying device described above, the number of electricity-supplying coils is changed due to the increase and decrease in the load at the electricity-receiving side. Therefore, the variation in a voltage applied to the load is suppressed. However, the number of the electricity-receiving coils and the number of iron cores are not changed. Therefore, a rate of an iron loss (hysteresis loss or eddy-current loss) to the supplied power increases when a low power is supplied, i.e., when a low load is applied. This entails a problem of deteriorating an electricity supplying efficiency.

The present invention is accomplished in view of the above-mentioned circumstances, and aims to provide a contactless electricity-supplying device that selectively couples an electricity-receiving coil in a number corresponding to a capacity of a load to plural electricity-supplying coils, and that can safely supply power to the load after it is confirmed that all of the electricity-receiving coils are surely electromagnetically coupled to the electricity-supplying coils.

Solution to the Problems

The present invention provides a contactless electricity-supplying device including a plurality of electricity-supplying coils; a DC/AC converter that converts an output voltage from a DC supplying unit into an AC voltage to be applied to each electricity-supplying coils; a plurality of electricity-receiving coils selectively and detachably mounted on positions where the electricity-receiving coils are electromagnetically coupled to the electricity-supplying coils to receive AC voltages from the corresponding electricity-supplying coils in a contactless manner; a plurality of rectifying/smooth units that each convert an AC voltage output from each electricity-receiving coil into a DC voltage and smooth the DC voltage; a switching device that connects the DC voltages output from the rectifying/smoothing units to a single load; an electricity-reception detection sensor for detecting that the electricity-receiving coils receive the AC voltages from the corresponding electricity-supplying coils; and a control unit that turns on the switching device when it is detected that all of the electricity-receiving coils receive the AC voltages from the corresponding electricity-supplying coils.

Effects of the Invention

According to the present invention, the plurality of electricity-receiving coils can selectively be coupled to the plurality of electricity-supplying coils, and when it is detected that all of the electricity-receiving coils receive electricity from the electricity-supplying coils, power is supplied to the load from all of the electricity-receiving coils in parallel. Therefore, if the number of the electricity-receiving coils is determined according to the capacity of the load, power can safely and efficiently be supplied to the load.

MODE FOR CARRYING OUT THE INVENTION

A contactless electricity-supplying device according to the present invention includes: a plurality of electricity-supplying coils; a DC/AC converter that converts an output voltage from a DC supplying unit into an AC voltage to be applied to each electricity-supplying coils; a plurality of electricity-receiving coils selectively and detachably mounted on positions where the electricity-receiving coils are electromagnetically coupled to the electricity-supplying coils to receive AC voltages from the corresponding electricity-supplying coils in a contactless manner; a plurality of rectifying/smoothing units that each convert an AC voltage output from each electricity-receiving coil into a DC voltage and smooth the DC voltage; a switching device that connects the DC voltages output from the rectifying/smoothing units to a single load; an electricity-reception detection sensor for detecting that the electricity-receiving coils receive the AC voltages from the corresponding electricity-supplying coils; and a control unit that turns on the switching device when it is detected that all of the electricity-receiving coils receive the AC voltages from the corresponding electricity-supplying coils.

The electricity-reception detection sensor may be a sensor for detecting whether or not a voltage is induced to each electricity-receiving coil from each corresponding electricity-supplying coil.

The contactless electricity-supplying device may further include a current balance resistance that is inserted between each of the rectifying/smoothing units and the load.

The DC/AC converter may include individual converters that individually apply an AC voltage to the plurality of electricity-supplying coils, each individual converter including an attachment detection sensor for driving the corresponding individual converter when detecting that the electricity-receiving coil is mounted on a position to be electromagnetically coupled to the electricity-supplying coil.

Figure 1:
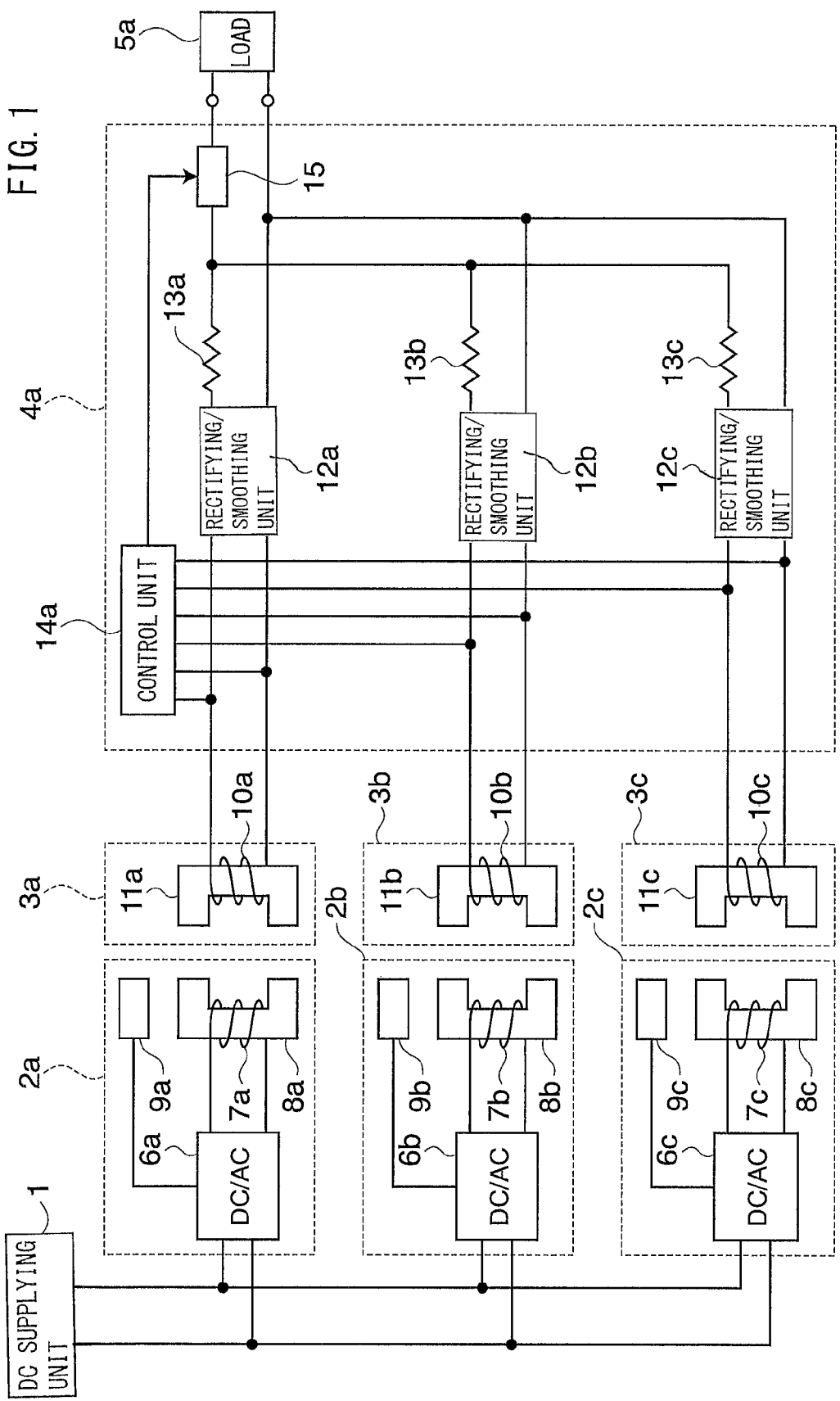
FIG. 1 is an electric circuit diagram illustrating a first embodiment of the present invention.

The present invention will be described below in detail with reference to embodiments illustrated in the drawings.
First Embodiment FIG. 1 is an electric circuit diagram illustrating a contactless electricity-supplying device according to the first embodiment of the present invention. As illustrated in FIG. 1, the contactless electricity-supplying device includes a DC supplying unit 1 with an output voltage of 400 V, socket units 2a, 2b, and 2c, plug units 3a, 3b, and 3c, and an adapter unit 4a, and it supplies electricity to a load 5a that is an automatic washing machine with a power consumption of 600 W.

The socket unit 2a includes a DC/AC converter 6a that converts a DC voltage of 400 V from the DC supplying unit 1 into an AC voltage with a duty ratio of 50% and a frequency of 50 kHz, an electricity-supplying coil 7a for supplying power to the corresponding plug unit 3a on receipt of the AC voltage from the DC/AC converter 6a, an electricity-supplying-side iron core 8a around which the electricity-supplying coil 7a is wound, and an attachment detection sensor 9a detecting that the electricity-receiving coil 10a is in a state of being capable of receiving power from the electricity-supplying coil 7a through the attachment of the plug unit 3a to the socket unit 2a.

The plug unit 3a includes an electricity-receiving coil 10a, and an electricity-receiving-side iron core 11a around which the electricity-receiving coil 10a is wound. The socket unit 2a is mounted in a recess formed on a wall of a building, and the plug unit 3a is inserted from a surface of the wall into the recess so as to be detachably mounted.

Therefore, the state in which the electricity-receiving coil 10a can receive power from the electricity-supplying coil 7a means that the socket unit 2a and the plug unit 3a are opposite to be in contact with each other in the recess, wherein the electricity-supplying coil 7a and the electricity-receiving coil 10a are electromagnetically coupled via the electricity-supplying-side iron core 8a and the electricity-receiving-side iron core 11a.

A power capacity of the DC/AC converter 6a, and a power capacity of an insulating transformer composed of the electricity-supplying coil 7a, the electricity-receiving coil 10a, the electricity-supplying-side iron core 8a, and the electricity-receiving-side iron core 11a are set to be 200 W respectively.

The socket unit 2b includes a DC/AC converter 6b that converts a DC voltage of 400 V from the DC supplying unit 1 into an AC voltage same as that of the DC/AC converter 6a, an electricity-supplying coil 7b that supplies power to the corresponding plug unit 3b on receipt of the AC voltage from the DC/AC converter 6b, an electricity-supplying-side iron core 8b around which the electricity-supplying coil 7b is wound, and an attachment detection sensor 9b detecting that the electricity-receiving coil 10b is in a state of being capable of receiving power from the electricity-supplying coil 7b through the attachment of the plug unit 3b to the socket unit 2b.

The plug unit 3b includes an electricity-receiving coil 10b, and an electricity-receiving-side iron core 11b around which the electricity-receiving coil 10b is wound. The socket unit 2b is mounted in a recess formed on a wall of a building like the socket unit 2a, and the plug unit 3b is inserted from a surface of the wall into the recess so as to be mounted detachably.

Therefore, the state in which the electricity-receiving coil 10b can receive power from the electricity-supplying coil 7b means that the socket unit 2b and the plug unit 3b are opposite to be in contact with each other in the recess, wherein the electricity-supplying coil 7b and the electricity-receiving coil 10b are electromagnetically coupled via the electricity-supplying-side iron core 8b and the electricity-receiving-side iron cores 11b.

The specification of the DC/AC converter 6b, the electricity-supplying coil 7b, the electricity-receiving coil 10b, the electricity-supplying-side iron core 8b, and the electricity-receiving-side iron core 11b are respectively equivalent to the specification of the DC/AC converter 6a, the electricity-supplying coil 7a, the electricity-receiving coil 10a, the electricity-supplying-side iron core 8a, and the electricity-receiving-side iron core 11a, and they are designed to have a power capacity of 200 W.

The socket unit 2c includes a DC/AC converter 6c that converts a DC voltage of 400 V from the DC supplying unit 1 into an AC voltage same as that of the DC/AC converter 6a, an electricity-supplying coil 7c that supplies power to the corresponding plug unit 3c on receipt of the AC voltage from the DC/AC converter 6c, an electricity-supplying-side iron core 8c around which the electricity-supplying coil 7c is wound, and an attachment detection sensor 9c detecting that the electricity-receiving coil 10c is in a state of being capable of receiving power from the electricity-supplying coil 7c through the attachment of the plug unit 3c to the socket unit 2c.

The plug unit 3c includes an electricity-receiving coil 10c, and an electricity-receiving-side iron core 11c around which the electricity-receiving coil 10c is wound. The socket unit 2c is mounted in a recess formed on a wall of a building like the socket unit 2a, and the plug unit 3c is inserted from a surface of the wall into the recess so as to be mounted detachably.

Therefore, the state in which the electricity-receiving coil 10c can receive power from the electricity-supplying coil 7c means that the socket unit 2c and the plug unit 3c are opposite to be in contact with each other in the recess, wherein the electricity-supplying coil 7c and the electricity-receiving coil 10c are electromagnetically coupled via the electricity-supplying-side iron core 8c and the electricity-receiving-side iron cores 11c.

The specification of the DC/AC converter 6c, the electricity-supplying coil 7c, the electricity-receiving coil 10c, the electricity-supplying-side iron core 8c, and the electricity-receiving-side iron core 11c are respectively equivalent to the specification of the DC converter 6a, the electricity-supplying coil 7a, the electricity-receiving coil 10a, the electricity-supplying-side iron core 8a, and the electricity-receiving-side iron core 11a, and they are designed to have a power capacity of 200 W.

The adapter unit 4a includes a rectifying/smoothing unit 12a that rectifies and smoothes the AC voltage induced to the electricity-receiving coil 10a of the plug unit 3a, a current balance resistance 13a, and a switching device 15 that connects the DC voltage outputted from the rectifying/smoothing unit 12a to the load 5a through the current balance resistance 13a.

The adapter unit 4a includes a rectifying/smoothing unit 12b that rectifies and smoothes the AC voltage induced to the electricity-receiving coil 10b of the plug unit 3b, and a current balance resistance 13b, wherein the DC voltage outputted from the rectifying/smoothing unit 12b is connected to the load 5a through the current balance resistance 13b and the switching device 15.

The adapter unit 4a includes a rectifying/smoothing unit 12c that rectifies and smoothes the AC voltage induced to the electricity-receiving coil 10c of the plug unit 3c, and a current balance resistance 13c, wherein the DC voltage outputted from the rectifying/smoothing unit 12c is connected to the load 5a through the current balance resistance 13c and the switching device 15.

The adapter unit 4a also includes a control unit 14a that detects the voltage induced to the electricity-receiving coils 10a, 10b, and 10c, and turns on the switching device 15, when the socket units 2a, 2b, and 2c are all attached to the plug units 3a, 3b, and 3c, the DC/AC converters 6a, 6b, and 6c are driven, and all of the electricity-receiving coils 10a, 10b, and 10c are normally electromagnetically coupled to the electricity-supplying coils 7a, 7b, and 7c.

An operation of the contactless electricity-supplying device thus configured will be described.

When none of the plug units 3a, 3b, and 3c are attached to the socket units 2a, 2b, and 2c at the beginning, none of the DC/AC converters 6a, 6b, and 6c are driven. Since the switching device 15 is turned off, power is not supplied to the load 5a.

When the plug unit 3a is attached to the socket unit 2a, the attachment detection sensor 9a detects this state, whereby the DC/AC converter 6a is driven to apply the AC voltage to the electricity-supplying coil 7a. The electricity-supplying coil 7a is electromagnetically coupled to the electricity-receiving coil 10a through the electricity-supplying-side iron core 8a and the electricity-receiving-side iron core 11a. By virtue of this coupling, the AC voltage is induced to the electricity-receiving coil 10a, and applied to the rectifying/smoothing unit 12a.

When the plug unit 3b is attached to the socket unit 2b, the attachment detection sensor 9b detects this state, whereby the DC/AC converter 6b is driven to apply the AC voltage to the electricity-supplying coil 7b. The electricity-supplying coil 7b is electromagnetically coupled to the electricity-receiving coil 10b through the electricity-supplying-side iron core 8b and the electricity-receiving-side iron core 11b. By virtue of this coupling, the AC voltage is induced to the electricity-receiving coil 10b, and applied to the rectifying/smoothing unit 12b.

When the plug unit 3c is attached to the socket unit 2c, the attachment detection sensor 9c detects this state, whereby the DC/AC converter 6c is driven to apply the AC voltage to the electricity-supplying coil 7c. The electricity-supplying coil 7c is electromagnetically coupled to the electricity-receiving coil 10c through the electricity-supplying-side iron core 8c and the electricity-receiving-side iron core 11c. By virtue of this coupling, the AC voltage is induced to the electricity-receiving coil 10c, and applied to the rectifying/smoothing unit 12c.

When the voltage is induced to all of the electricity-receiving coils 10a, 10b, and 10c, the control unit 14a turns on the switching device 15. With this operation, each DC voltage output from the rectifying/smoothing units 12a, 12b, and 12c is applied to the load 5a, while the current supplied to the load 5a from the rectifying/smoothing units 12a, 12b, and 12c in parallel is adjusted to be almost equal to one another by the current balance resistances 13a, 13b, and 13c.

Thus, power is efficiently supplied to the load 5a, which is the automatic washing machine with 600 W, by three contactless outlets, each having a capacity of 200 W, i.e., by three sets of the socket unit 2a and the plug unit 3a, the socket unit 2b and the plug unit 3b, and the socket unit 2c and the plug unit 3c.

When the power supplying circuit from the DC/AC converter 6a to the rectifying/smoothing unit 12a, the power supplying circuit from the DC/AC converter 6b to the rectifying/smoothing unit 12b, and the power supplying circuit from the DC/AC converter 6c to the rectifying/smoothing unit 12c respectively have an appropriate voltage drop characteristic (the characteristic in which the output voltage drops, as the output current increases), the current balance resistances 13a, 13b, and 13c can be excluded.

Figure 2:
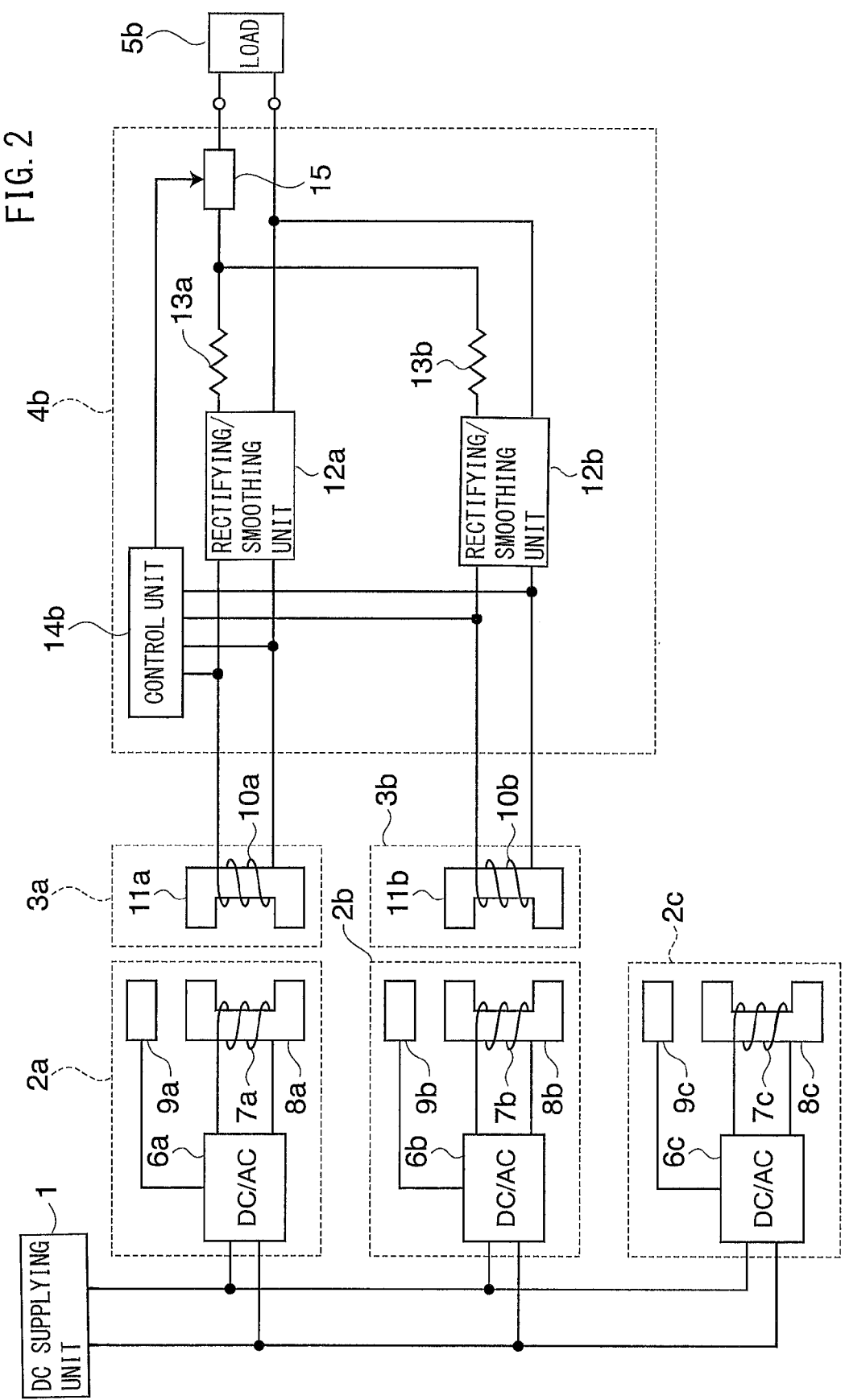
FIG. 2 is an electric circuit diagram illustrating a second embodiment of the present invention.

FIG. 2 is an electric circuit diagram illustrating a contactless electricity-supplying device according to a second embodiment of the present invention. As illustrated in FIG. 2, the contactless electricity-supplying device includes a DC supplying unit 1 with an output voltage of 400 V, socket units 2a, 2b, and 2c, plug units 3a, and 3b, and an adapter unit 4b, and it supplies electricity to a load 5b that is a liquid crystal television with a power consumption of 400 W.

The contactless electricity-supplying device according to the second embodiment is formed by eliminating the plug unit 3c, the rectifying/smoothing unit 12c, and the current balance resistance 13c from the contactless electricity-supplying device illustrated in FIG. 1, and by replacing the control unit 14a with the control unit 14b. The other configuration is the same as that of the contactless electricity-supplying device illustrated in FIG. 1.

When the plug units 3a and 3b are attached to the socket units 2a and 2b, the DC/AC converters 6a and 6b are driven, and both of the electricity-receiving coils 10a and 10b are normally electromagnetically coupled to the electricity-supplying coils 7a and 7b, the control unit 14b detects the voltage induced to the electricity-receiving coils 10a and 10b, and turns on the switching device 15.

An operation of the contactless electricity-supplying device thus configured will be described.

When neither of the plug units 3a nor 3b is attached to the socket units 2a, 2b, and 2c at the beginning, none of the DC/AC converters 6a, 6b, and 6c are driven. Since the switching device 15 is turned off, power is not supplied to the load 5b.

When the plug unit 3a is attached to the socket unit 2a, the attachment detection sensor 9a detects this state, whereby the DC/AC converter 6a is driven to apply the AC voltage to the electricity-supplying coil 7a. The electricity-supplying coil 7a is electromagnetically coupled to the electricity-receiving coil 10a through the electricity-supplying-side iron core 8a and the electricity-receiving-side iron core 11a. By virtue of this coupling, the AC voltage is induced to the electricity-receiving coil 10a, and applied to the rectifying/smoothing unit 12a.

When the plug unit 3b is attached to the socket unit 2b, the attachment detection sensor 9b detects this state, whereby the DC/AC converter 6b is driven to apply the AC voltage to the electricity-supplying coil 7b. The electricity-supplying coil 7b is electromagnetically coupled to the electricity-receiving coil 10b through the electricity-supplying-side iron core 8b and the electricity-receiving-side iron core 11b. By virtue of this coupling, the AC voltage is induced to the electricity-receiving coil 10b, and applied to the rectifying/smoothing unit 12b.

When the voltage is induced to both of the electricity-receiving coils 10a and 10b, the control unit 14b turns on the switching device 15. With this operation, each DC voltage output from the rectifying/smoothing units 12a and 12b is applied to the load 5b, while the current supplied to the load 5b from the rectifying/smoothing units 12a and 12b in parallel is adjusted to be almost equal to each other by the current balance resistances 13a and 13b.

Thus, power is efficiently supplied to the load 5b with 400 W by two contactless outlets, each having a capacity of 200 W, i.e., by two sets of the socket unit 2a and the plug unit 3a, and the socket unit 2b and the plug unit 3b.

Figure 3:
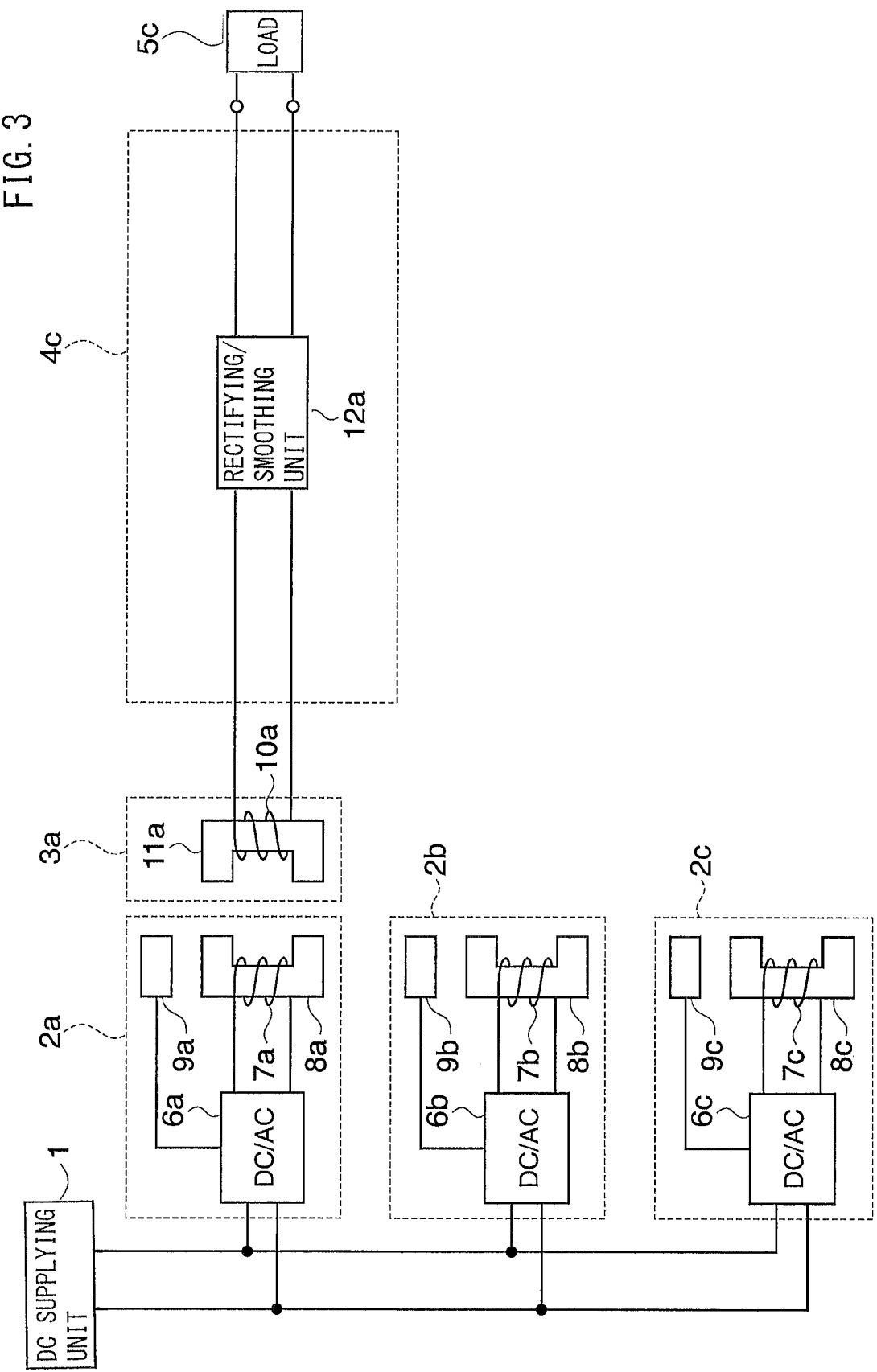
FIG. 3 is an electric circuit diagram illustrating a reference embodiment of the present invention.

FIG. 3 is an electric circuit diagram illustrating a reference example of the present invention, wherein only one set of the socket unit 2a and the plug unit 3a is used to supply power to a load 5c that is an illumination light with a power consumption of 200 W in the first and second embodiments including the socket units 2a, 2b, and 2c.

In this case, when the plug unit 3a is attached to the socket unit 2a, the attachment detection sensor 9a detects this state, whereby the DC/AC converter is driven to apply the AC voltage to the rectifying/smoothing unit 12a through the electricity-supplying coil 7a and the electricity-supplying coil 10a. Therefore, power is efficiently supplied to the load 5c with 200 W from the rectifying/smoothing unit 12a.

DESCRIPTION OF REFERENCE SIGNS

1: DC supplying unit
2a, 2b, 2c: Socket unit
3a, 3b, 3c: Plug unit
4a, 4b, 4c: adapter unit
5a, 5b, 5c: Load
6a, 6b, 6c: DC/AC converter
7a, 7b, 7c: Electricity-supplying coil
8a, 8b, 8c: Electricity-supplying-side iron core
9a, 9b, 9c: Attachment detection sensor
10a, 10b, 10c: Electricity-receiving coil
11a, 11b, 11c: Electricity-receiving-side iron core
12a, 12b, 12c: Rectifying/smoothing unit
13a, 13b, 13c: Current balance resistance
14a, 14b: Control unit
15: Switching device

The invention claimed is:

1. A contactless electricity-supplying device comprising:
a plurality of electricity-supplying coils;
DC/AC converters that convert an output voltage from a DC supplying unit into AC voltages to be applied to the electricity-supplying coils;
at least two electricity-receiving coils selectively and detachably mounted in parallel on positions where the electricity-receiving coils are electromagnetically coupled to the electricity-supplying coils to receive AC voltages from the corresponding electricity-supplying coils in a contactless manner;
a plurality of rectifying/smooth units that each convert an AC voltage output from each electricity-receiving coil into a DC voltage and smooth the DC voltage;
a switching device that connects the DC voltages output from the rectifying/smoothing units to a single load;
electricity-reception detection sensors for detecting that the electricity-receiving coils receive the AC voltages from the corresponding electricity-supplying coils; and
a control unit that turns on the switching device when it is detected that all of the electricity-receiving coils receive the AC voltages from the corresponding electricity-supplying coils.

2. The contactless electricity-supplying device according to claim 1, wherein the electricity-reception detection sensor is a sensor for detecting whether or not a voltage is induced to each electricity-receiving coil from each corresponding electricity-supplying coil.

3. The contactless electricity-supplying device according to claim 1, further comprising a current balance resistance that is inserted between each of the rectifying/smoothing units and the load.

4. The contactless electricity-supplying device according to claim 1, wherein the DC/AC converters include individual converters that individually apply an AC voltage to the electricity-supplying coils, each individual converter comprising an attachment detection sensor for driving the corresponding individual converter when detecting that the electricity-receiving coil is mounted on a position to be electromagnetically coupled to the electricity-supplying coil.

5. The contactless electricity-supplying device according to claim 4, wherein each of the electricity-supplying coils and each of the DC/AC converters are accommodated in a socket unit, each of the electricity-receiving coils is accommodated in a plug unit, the socket unit is mounted in a recess formed on a wall of a building, and the plug unit is detachably inserted in the recess from a surface of the wall.

6. The contactless electricity-supplying device according to claim 1, wherein a power supplying circuit from the DC/AC converter to the rectifying/smoothing unit has a voltage drop characteristic.

7. The contactless electricity-supplying device according to claim 1, wherein each of the electricity-supplying coils and each of the electricity-receiving coils are wound around an electricity-supplying-side iron core and an electricity-receiving-side iron core, respectively.

8. The contactless electricity-supplying device according to claim 1, wherein the electricity-supplying coils include three electricity-supplying coils, and the electricity-receiving coils include three electricity-supplying coils.

9. The contactless electricity-supplying device according to claim 1, wherein the electricity-supplying coils include three electricity-supplying coils, and the electricity-receiving coils include two electricity-supplying coils.

10. The contactless electricity-supplying device according to claim 1, wherein the control unit is configured to turn on the switching device when it is detected that all of the electricity-receiving coils simultaneously receive the AC voltages from the corresponding electricity-supplying coils.

11. The contactless electricity-supplying device according to claim 1, wherein the control unit is configured to turn off the switching device and thereby not supply power to the load when the control unit detects that any one of the electricity-receiving coils to which the control unit is connected does not receive AC voltage from its corresponding electricity-supplying coil.

* * * * *